United States Patent
McCrary et al.

(10) Patent No.: US 9,176,795 B2
(45) Date of Patent: Nov. 3, 2015

(54) GRAPHICS PROCESSING DISPATCH FROM USER MODE

(75) Inventors: Rex McCrary, Oviedo, FL (US);
Michael Houston, Cupertino, CA (US);
Philip J. Rogers, Pepperell, MA (US);
Gongxian Jeffrey Cheng, Toronto (CA);
Mark Hummel, Franklin, MA (US);
Paul Blinzer, Bellevue, WA (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 383 days.

(21) Appl. No.: 13/289,304

(22) Filed: Nov. 4, 2011

(65) Prior Publication Data

US 2012/0188258 A1    Jul. 26, 2012

Related U.S. Application Data

(60) Provisional application No. 61/422,465, filed on Dec. 13, 2010.

(51) Int. Cl.
| | |
|---|---|
| G06T 1/00 | (2006.01) |
| G06T 15/00 | (2011.01) |
| G06F 9/46 | (2006.01) |
| G06F 9/54 | (2006.01) |

(52) U.S. Cl.
CPC .............. *G06F 9/545* (2013.01); *G06F 9/544* (2013.01)

(58) Field of Classification Search
USPC .......... 345/501–503, 522; 718/100–103, 107, 718/108
See application file for complete search history.

(56) References Cited

U.S. PATENT DOCUMENTS

| 7,631,309 B2 | 12/2009 | Wilt et al. |
| 7,647,496 B2 * | 1/2010 | Callender et al. ............. 713/164 |

(Continued)

FOREIGN PATENT DOCUMENTS

EP    1326165 A2    7/2003

OTHER PUBLICATIONS

International Search Report and Written Opinion of the International Searching Authority for International Patent Application No. PCT/U32011/063240, ISA/DE, European Patent Office, Munich, Germany, dated Feb. 17, 2012, 68 pages.

(Continued)

*Primary Examiner* — Jacinta M Crawford
(74) *Attorney, Agent, or Firm* — Volpe and Koenig, P.C.

(57) ABSTRACT

A method, system, and computer program product are disclosed for providing improved access to accelerated processing device compute resources to user mode applications. The functionality disclosed allows user mode applications to provide commands to an accelerated processing device without the need for kernel mode transitions in order to access a unified ring buffer. Instead, applications are each provided with their own buffers, which the accelerated processing device hardware can access to process commands. With full operating system support, user mode applications are able to utilize the accelerated processing device in much the same way as a CPU.

21 Claims, 13 Drawing Sheets

(56) References Cited

U.S. PATENT DOCUMENTS

| | | | |
|---|---|---|---|
| 7,650,603 B2* | 1/2010 | Green | 718/104 |
| 7,830,387 B2* | 11/2010 | Pronovost et al. | 345/501 |
| 8,345,053 B2* | 1/2013 | Jiao et al. | 345/505 |
| 8,522,242 B2* | 8/2013 | Jiang et al. | 718/101 |
| 2004/0160446 A1* | 8/2004 | Gosalia et al. | 345/503 |
| 2004/0187135 A1* | 9/2004 | Pronovost et al. | 718/104 |
| 2006/0015880 A1* | 1/2006 | Kouznetsov et al. | 719/318 |
| 2007/0091101 A1 | 4/2007 | Huang et al. | |
| 2007/0136730 A1* | 6/2007 | Wilt et al. | 718/102 |
| 2011/0050713 A1* | 3/2011 | McCrary et al. | 345/522 |
| 2011/0067038 A1 | 3/2011 | Troccoli et al. | |

OTHER PUBLICATIONS

International Search Report and Written Opinion for International Application No. PCT/US2011/063235, European Patent Office, Netherlands, mailed on Feb. 17, 2012 (10 pages).

International Search Report and Written Opinion for International Application No. PCT/US2011/063238, European Patent Office, Netherlands, mailed on Mar. 8, 2012 (11 pages).

* cited by examiner

GRAPHICS PROCESSING DISPATCH FROM USER MODE

CROSS-REFERENCE TO RELATED APPLICATIONS

This application claims the benefit of U.S. Provisional Patent Application Ser. No. 61/422,465, filed Dec. 13, 2010, entitled "Graphics Processing Dispatch from User Mode," which is incorporated herein by reference in its entirety.

BACKGROUND

1. Field of the Invention

The present invention is generally directed to computing systems. More particularly, the present invention is directed to unifying the computational components within a computing system.

2. Background

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Both the discrete and single chip arrangements can limit the types of commands that can be sent to the GPU for execution. By way of example, computational commands (e.g., physics or artificial intelligence commands) often cannot be sent to the GPU for execution. This limitation exists because the CPU may relatively quickly require the results of the operations performed by these computational commands. However, because of the high overhead of dispatching work to the GPU in current systems and the fact that these commands may have to wait in line for other previously-issued commands to be executed first, the latency incurred by sending computational commands to the GPU is often unacceptable.

An additional difficulty faced in using GPUs for computational offloading lies in the software tools available to developers to interface with the GPU and provide work. Many of the existing software tools are designed with the GPO's graphics capabilities in mind, and therefore lack the capability to easily provide non-graphics work to a GPU.

SUMMARY OF EMBODIMENTS

What is, needed, therefore, is improved support for accessibility of GPU compute resources.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Various embodiments of the present invention include a method and apparatus for allocating an APD work queue for an application via a kernel mode driver, forwarding commands to the work queue from the application, and dispatching the commands from the work queue to the APD.

Additional features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
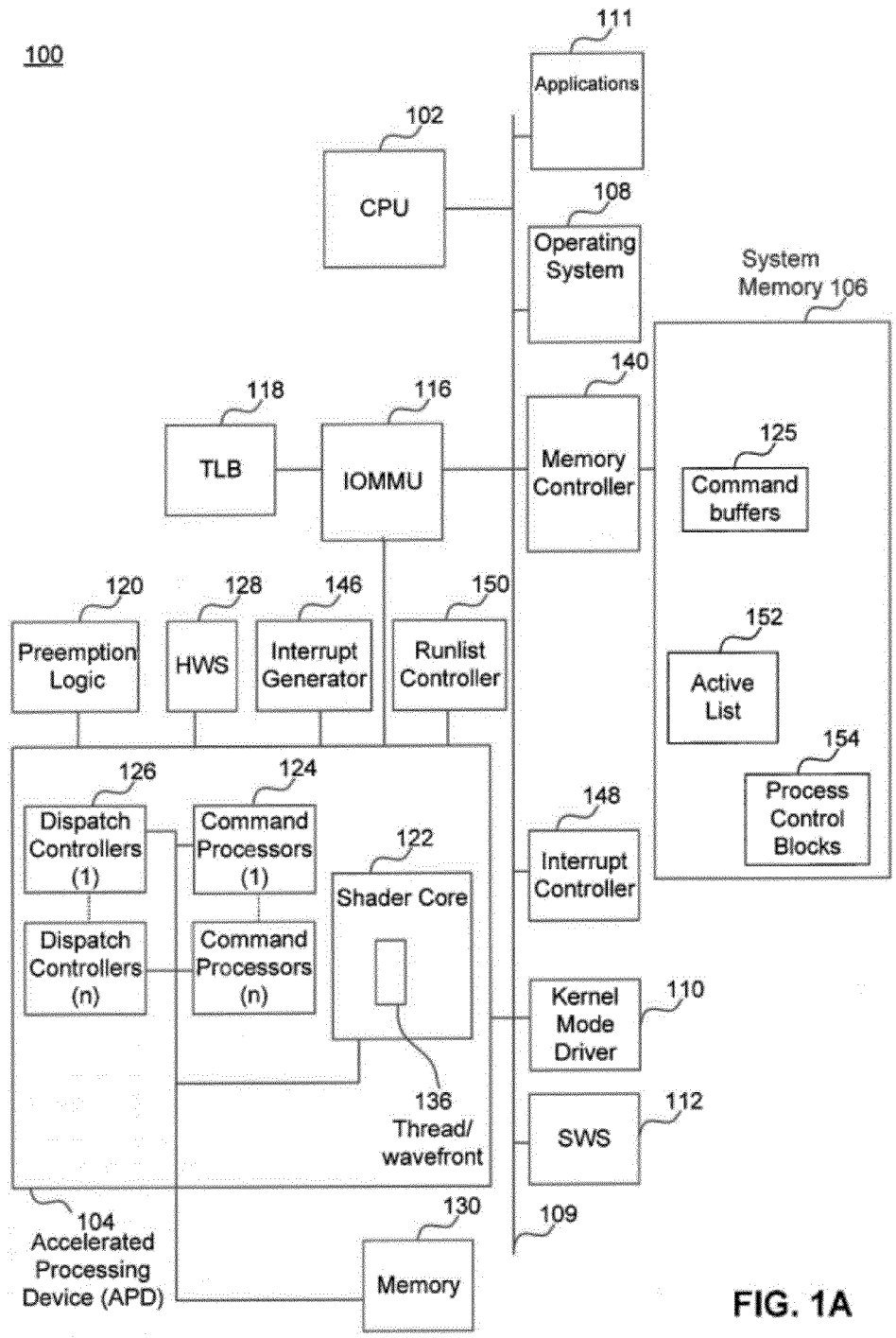
FIG. 1A is an illustrative block diagram of a processing system in accordance with embodiments of the present invention.

FIG. 1A is an exemplary illustration of a unified computing system 100 including two processors, a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as input/output memory management unit (IOMMU). Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection is of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from run list

150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104. In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
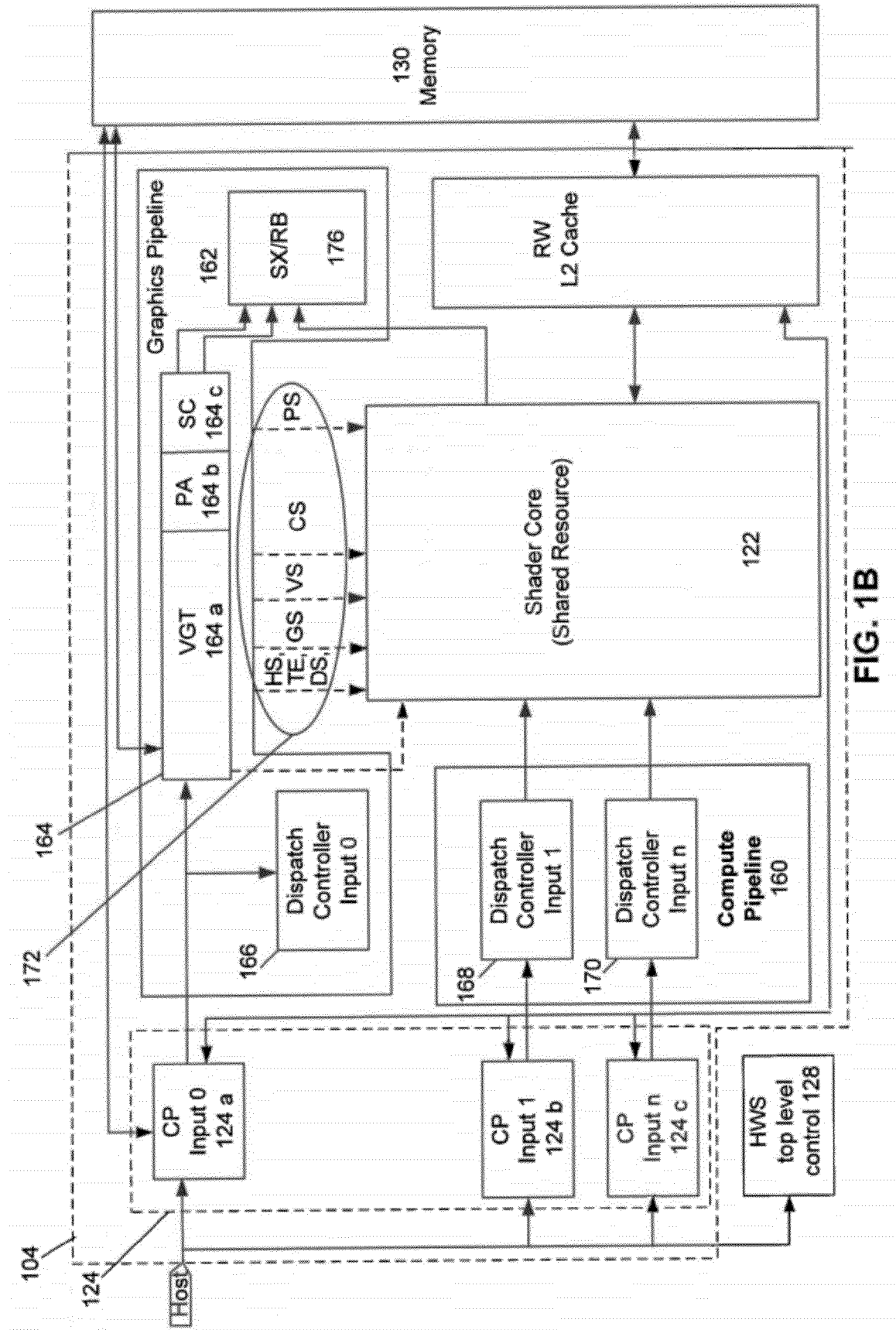
FIG. 1B is an illustrative block diagram of the APD illustrated in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122, Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the APD.

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

Figure 2:
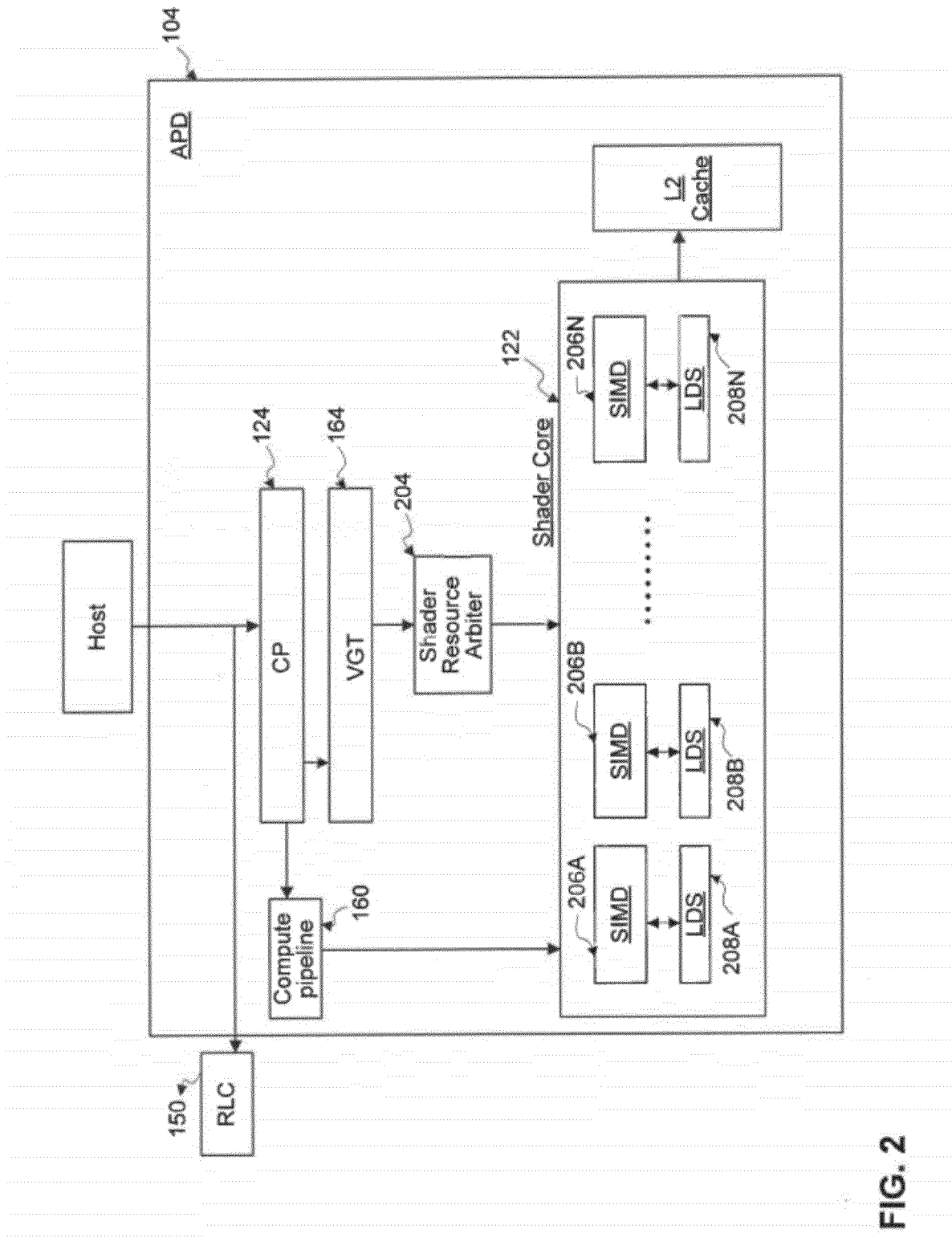
FIG. 2 is a more detailed block diagram of the APD illustrated in FIG. 1B.

FIG. 2 is a block diagram showing greater detail of APD 104 illustrated in FIG. 1B. In the illustration of FIG. 2, APD 104 includes a shader resource arbiter 204 to arbitrate access to shader core 122. In FIG. 2, shader resource arbiter 204 is external to shader core 122. In another embodiment, shader resource arbiter 204 can be within shader core 122. In a further embodiment, shader resource arbiter 204 can be included in graphics pipeline 162. Shader resource arbiter 204 can be configured to communicate with compute pipeline 160, graphics pipeline 162, or shader core 122.

Shader resource arbiter 204 can be implemented using hardware, software, firmware, or any combination thereof. For example, shader resource arbiter 204 can be implemented as programmable hardware.

As discussed above, compute pipeline 160 includes DCs 168 and 170, as illustrated in FIG. 1B, which receive the input thread groups. The thread groups are broken down into wavefronts including a predetermined number of threads. Each wavefront thread may comprise a shader program, such as a vertex shader. The shader program is typically associated with a set of context state data. The shader program is forwarded to shader core 122 for shader core program execution.

During operation, each shader core program has access to a number of general purpose registers (GPRs) (not shown), which are dynamically allocated in shader core 122 before running the program. When a wavefront is ready to be processed, shader resource arbiter 204 allocates the GPRs and thread space. Shader core 122 is notified that a new wavefront is ready for execution and runs the shader core program on the wavefront.

As referenced in FIG. 1, APD 104 includes compute units, such as one or more SIMDs. In FIG. 2, for example, shader core 122 includes SIMDs 206A-206N for executing a respective instantiation of a particular work group or to process incoming data. SIMDs 206A-206N are respectively coupled to local data stores (LDSs) 208A-208N. LDSs 208A-208N provide a private memory region accessible only by their respective SIMDs and is private to a work group. LDSs 208A-208N store the shader program context state data.

It would be apparent to one of skill in the art that aspects of the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Additionally, and as will be apparent to one of skill in the art, the simulation, synthesis and/or manufacture of the various embodiments of this invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium).

As such, the code can be transmitted over communication networks including the Internet and intranets. It is understood that the functions accomplished and/or structure provided by the systems and techniques described above can be represented in a core (such as APD core and/or a CPU core or other processing cores) that is embodied in program code and may be transformed to hardware as part of the production of integrated circuits.

Figure 3:
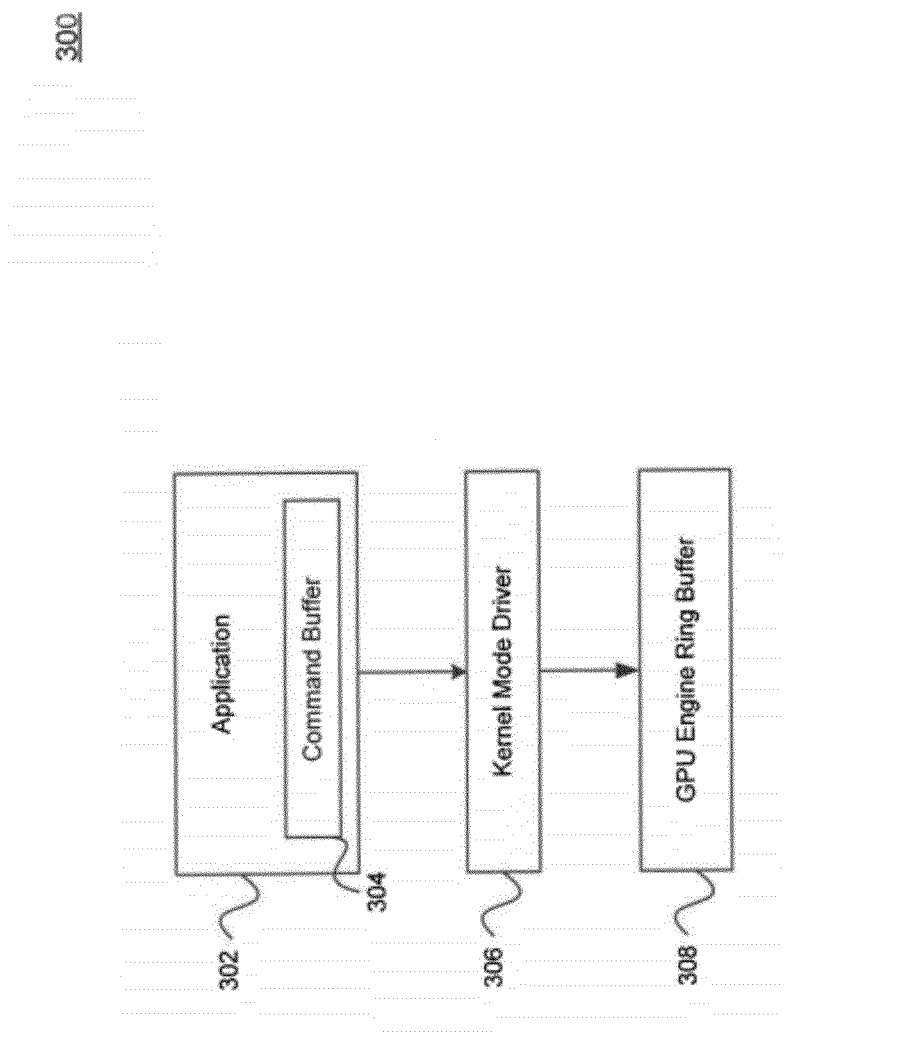
FIG. 3 illustrates a data flow model which relies on a kernel mode driver to submit commands to the APD.

FIG. 3 illustrates a data flow model 300 which relies on a kernel mode driver to submit commands to the APD. In this data flow model, a user mode application 302 operates a command buffer 304, to which application 302 writes commands for execution by an APD core. When the application 302 is ready (e.g., because the command buffer is full), the application 302 forwards the data from the command buffer to a kernel mode driver 306 having access to an APD engine ring buffer 308. The kernel mode driver 306 (or other kernel mode software) is able to read commands from the command buffer 304 and write them to the APD engine ring buffer 308.

Figure 4:
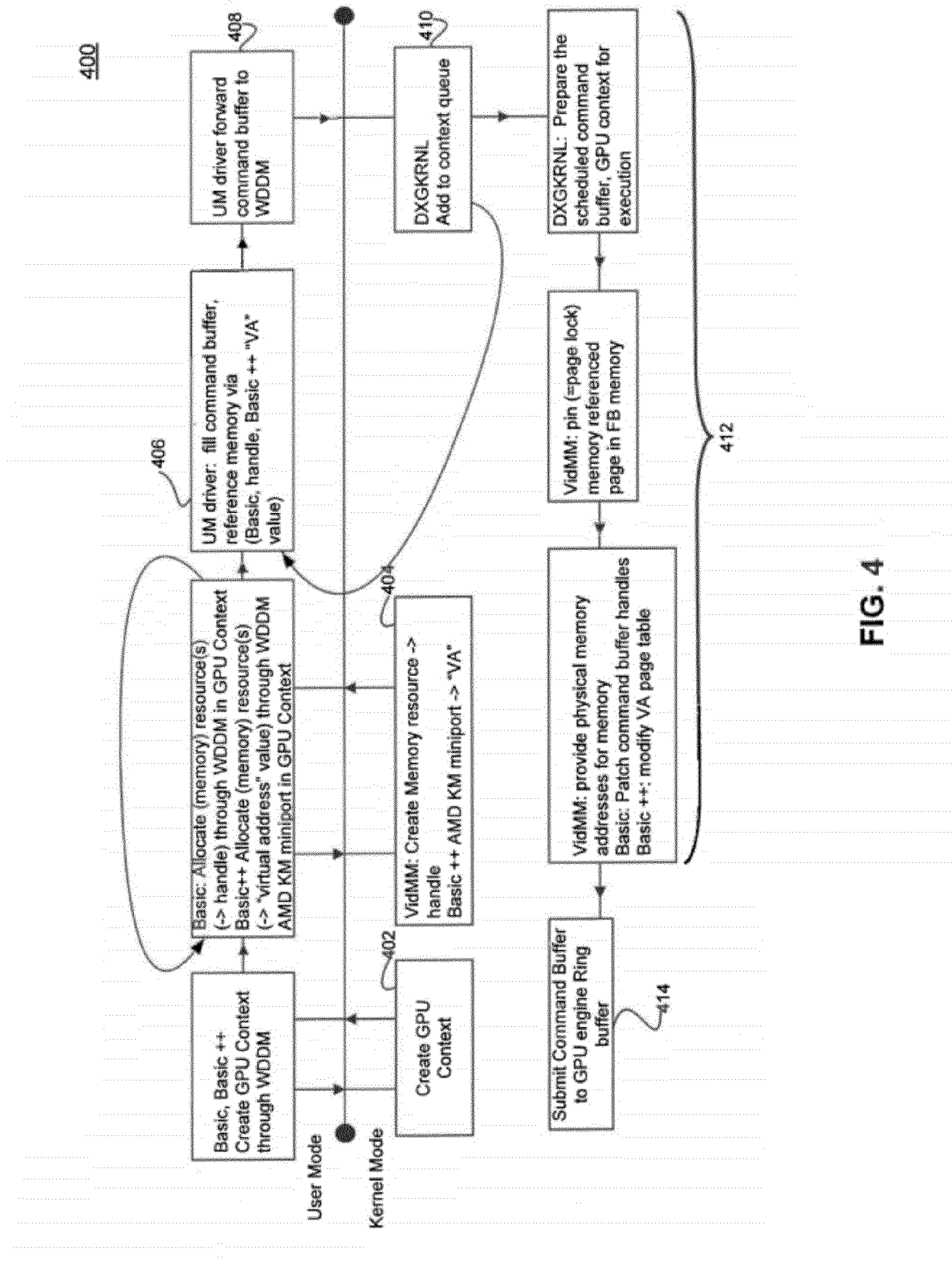
FIG. 4 illustrates an additional data flow model applying the concepts of the data flow model of FIG. 3 to an exemplary Windows environment.

The approach of data flow model 300 transitions between user mode and kernel mode with every submission of commands to the ring buffer 308. FIG. 4 illustrates an additional data flow model 400 applying the concepts of data flow model 300 of FIG. 3 to an exemplary Windows environment, although one skilled in the relevant arts will recognize the applicability of data flow model 400 to other operating environments.

As is shown in data flow model 400, an APD context for an application, such as user mode application 302, is created at step 402 and memory allocated at step 404 using kernel mode driver functionality (including, for example, allocation of command buffer 304). User mode application 302 fills command buffer 304 with instructions at step 406, which is then forwarded to a Windows Display Driver Model ("WDDM", in an exemplary Windows environment) component at step 408. At step 410, a kernel mode driver can add a context for application 302 to a context queue, indicating that command buffer 304 is ready for processing. Kernel mode software is then able to submit commands from command buffer 304 to the APD engine ring buffer 308 at step 414.

This approach funnels an application's APD instructions through the kernel mode driver (e.g., DXGKRNL in a Windows environment). There are a number of disadvantages to this approach, primarily stemming from the original design focus of the APD. In this approach, the APD is not intended to handle general processing instructions from an application outside of a graphics context. Everything must be packaged through the standard graphics interfaces. The necessary transitions between user mode and kernel mode when submitting commands are expensive, requiring hardware privilege level transitions. Additionally, writing to the single APD engine ring buffer 308 requires a lock, which may block other APD-bound applications.

An additional challenge faced by this legacy approach is that operations being added to the APD ring buffer must be tested for references to virtual memory space. Specifically, the APD is only permitted to operate on APD memory and pinned system memory. Otherwise, data referenced by an operation must be brought in to either APD memory or pinned system memory, such as by copying the referenced data to main memory and pinning it.

Prior to submission of the commands to the APD engine ring buffer 308, steps 412 are performed to ensure that the APD can access memory referenced by the commands being written to the APD engine ring buffer 308. This includes traversing the command buffer for all references to virtual memory and patching these references with physical memory address references. If no physical memory reference currently exists, the data referenced by virtual memory must be paged in to pinned system memory of APD memory so that it can be used by the APD.

The need to assure availability of referenced memory for all operations prior to posting the operation to the APD ring buffer can become expensive. The patching check must be performed on all operations whether or not referenced data is already present in pinned system memory or APD memory. As a result, submitting commands to the APD ring buffer entails significant overhead.

In order to overcome or reduce the performance issues associated with the data flow models illustrated in FIGS. 3 and 4, it is beneficial to embed functionality that allows the APD to be treated as a first-class citizen. In other words, to be treated as a computing resource on a par (or closer to par) with the CPU. The concept of allowing the APD and APD-accessible memory space to be treated in a similar manner to the CPU can be achieved in a number of different ways. However, in various embodiments (e.g., with full support from the operating system and native hardware support), it is possible to avoid kernel mode transitions beyond initialization of an application.

Figure 5:
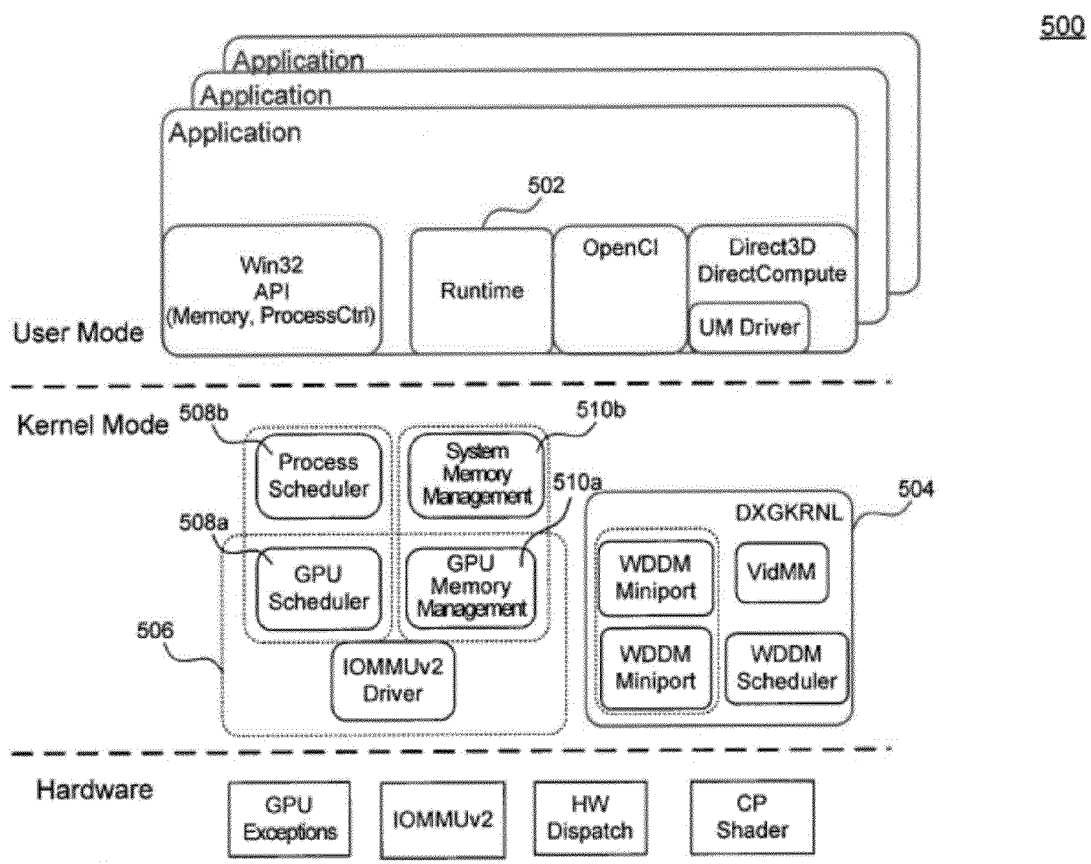
FIG. 5 illustrates exemplary components of a system stack, in accordance with an embodiment of the present invention.

FIG. 5 illustrates exemplary components of a system stack 500 in accordance with an embodiment of the present invention. Each user mode application includes a runtime 502, allowing establishment and connection of resources with the application. Instead of channeling commands through DXGKRNL 504 (which is the Microsoft Windows DirectX graphics kernel subsystem, representative of legacy graphics-oriented kernel mode driver interfaces to the APD), through the examples illustrated above, system stack 500 introduces an IOMMUv2 driver 506, which permits allocation of memory and command queues for applications.

System stack 500 further includes APD scheduler 508a and CPU scheduler 508b. While CPU scheduler 508b is analogous to traditional schedulers present in existing systems for scheduling CPU-bound work, APD scheduler 508a handles scheduling of APD-bound work. The operation of APD scheduler 508a is described in further detail below.

System stack 500 additionally includes APD memory management component 510a and CPU memory management component 510b. While CPU memory management component 510b is analogous to traditional memory managers present in existing operating systems for allocating memory to CPU-bound applications, APD memory management component 510a handles allocation of memory objects for applications with APD-bound commands.

While FIG. 5 illustrates an exemplary embodiment where cooperation is obtained from the operating system and underlying hardware, one skilled in the relevant arts will appreciate that other mechanisms may be employed to avoid the performance issues associated with the data flow models of FIGS. 3 and 4.

Figure 6:
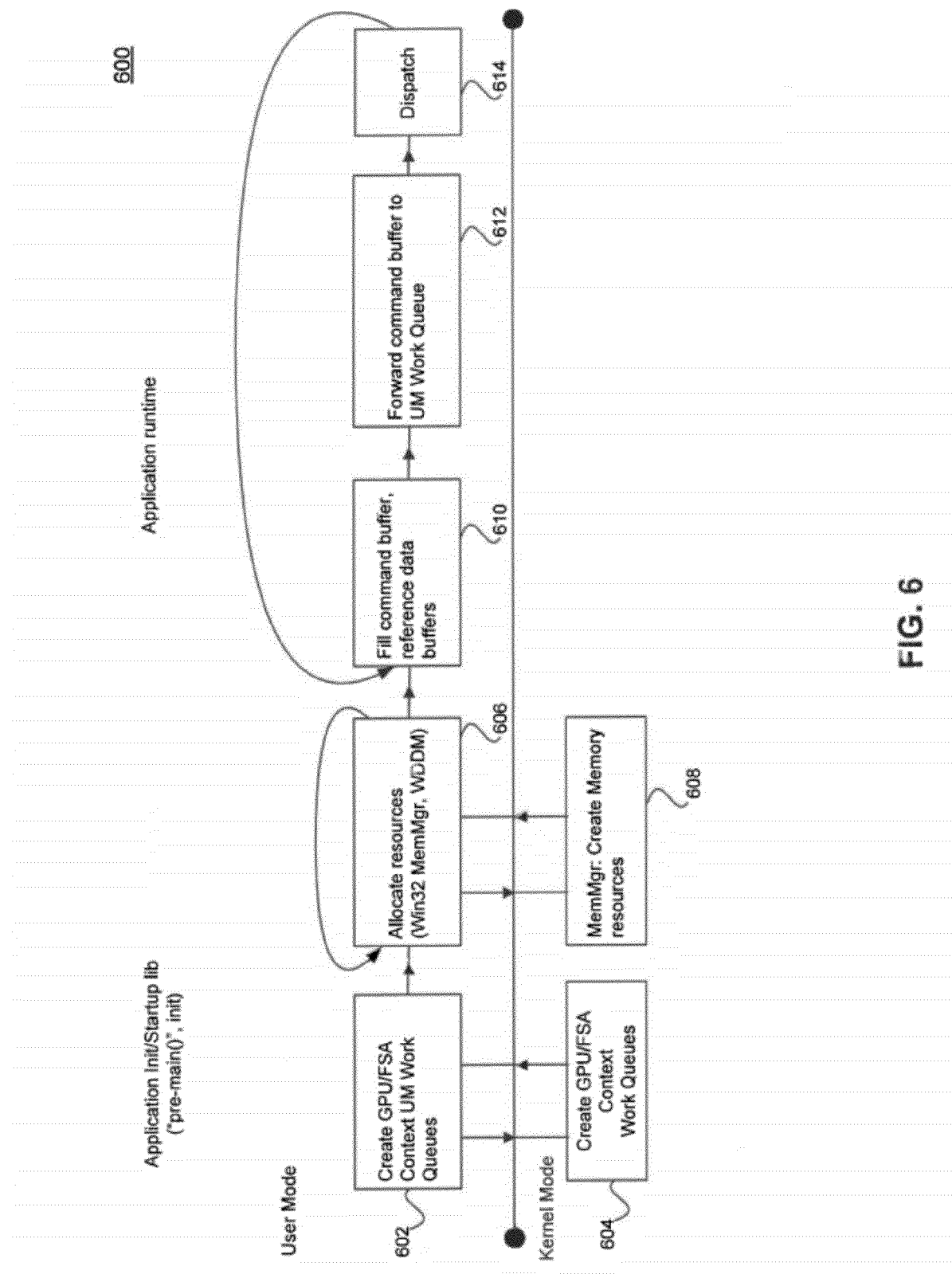
FIG. 6 illustrates an exemplary data flow model, in accordance with an embodiment of the present invention.

FIG. 6 illustrates an exemplary data flow model 600, in accordance with an embodiment of the present invention. Although data flow model 600 references components of the Microsoft Windows operating system, one skilled in the relevant arts will appreciate that the concepts illustrated by data flow model 600 can be applied to other systems including, but not limited to, other operating systems.

By way of the IOMMUv2 driver 506 of FIG. 5 (or other kernel mode driver or kernel mode software component), a user mode application can create its own user mode accessible work queue (e.g., a ring buffer) at step 602. During initialization, and by way of non-limiting example, the user mode application calls a function in runtime 502 to allocate a work queue. This work queue may be, by way of non-limiting example, a ring buffer or other FIFO queue, although one skilled in the relevant arts will appreciate that other techniques for command buffering may be used. The application further calls a kernel mode function in the kernel mode driver, which registers the ring buffer at step 604 for access by the APD.

This same kernel mode driver also accepts a resource allocation request at step 606 from the application and allocates resources, such as APD memory or pinned system memory at step 608, in accordance with a further embodiment of the present invention. Memory may be allocated using virtual memory addresses, which may correspond to data not presently in the physical memory space (as is the case prior to initialization).

After initialization, data flow model 600 illustrates the behavior of the user mode application during runtime. During application runtime, the application can fill a command buffer at step 610. The command buffer's contents can then be forwarded to the application's ring buffer at step 612, from which instructions are dispatched to the APD at step 614.

One skilled in the relevant arts will appreciate that the use of a command buffer, such as the command buffer at step 610, is optional, and commands may instead be forwarded directly to the ring buffer used at step 612. A command buffer may be employed, by way of non-limiting examples, in situations where writes to the ring buffer would be expensive operations (such as when the write operation blocks a unified ring buffer in the examples of FIGS. 3 and 4). However, in instances where each application has its own ring buffer allocated by the kernel mode driver, this operation may not have the same costs traditionally associated with it, and therefore performance cost savings can be realized by forgoing the command buffer. References herein to the command buffer therefore contemplate scenarios where commands being placed in the command buffer are instead forwarded directly to the application's ring buffer.

Figure 7:
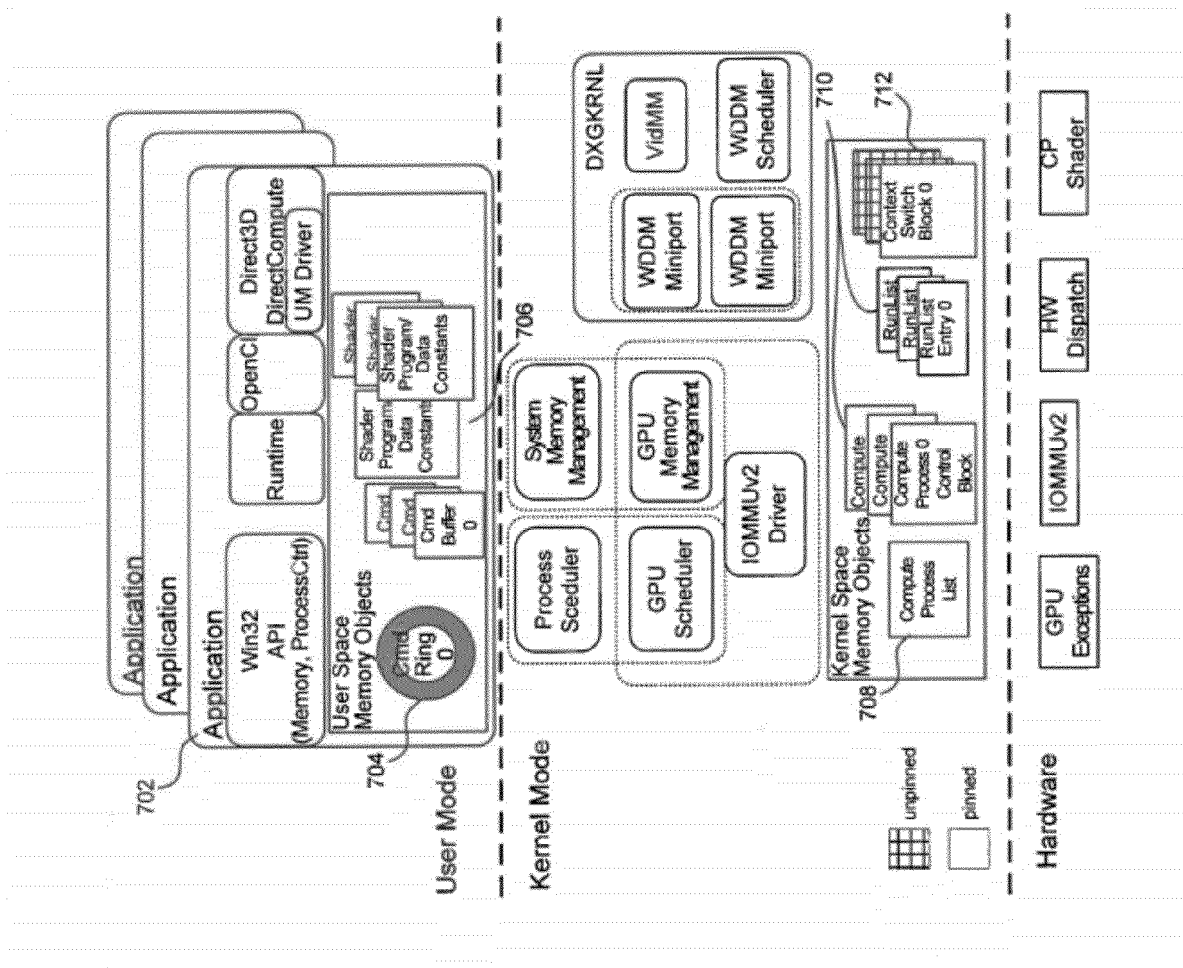
FIG. 7 illustrates a system overview of the architecture at runtime, in accordance with an embodiment of the present invention.

At runtime, an illustrative embodiment relies on several components in order to handle instruction processing by the APD. FIG. 7 illustrates a system overview 700 of an exemplary architecture at runtime, in accordance with an embodiment of the present invention. As previously noted, each application 702 is allocated its own ring buffer 704. This ring buffer 704 may be written to by commands stored in one or more command buffers 706. However, as previously discussed, the use of command buffers 706 is optional, and commands may instead be written directly to the ring buffer 704.

Additionally, the kernel mode driver allocates and maintains several kernel space memory objects. These kernel space memory objects include compute process control blocks and run list entries 710, each allocated to a corresponding application 702. A master compute process list 708, referencing outstanding instances of the compute process control blocks 710, is used to track the list of registered applications. One skilled in the relevant arts will appreciate that other methods of maintaining information regarding individual applications 702 may be used, and this particular methodology is provided by way of example, and not limitation. The kernel space memory objects also include context switch blocks 712. These blocks of memory are used to save the current state (i.e., context) of the APD whenever the corresponding application is switched out in a multitasking environment. Application context switching is further discussed below with regard to operation of the scheduler.

As previously noted, one of the benefits of the architecture described in system overview 700 is the ability to avoid kernel mode transitions when sending work to the APD from a user mode application. When an application 702 registers with the kernel mode driver, it is assigned a corresponding compute process control block 710. The APD accesses the compute process control blocks 710 to obtain privilege state information related to an associated process context, which includes the location of ring buffer 704 of application 702. As a result, the APD can access commands from ring buffer 704 without the need for a costly kernel mode transition.

Compute process control blocks 710 may contain additional information useful to process scheduling. For example, a priority level (e.g., low, medium, high, realtime) for the corresponding application 702 may be kept in a compute process control block 710, which can be utilized by the scheduler to allocate APD processing time to the application 702, as will be described in further detail below. Priority information may also include a timer reset value, indicating an amount of APD processing time (such as a number of clock cycles or individual instructions) to process during a next scheduling window. Compute process control blocks 710 also contain a reference to the corresponding context switch block 712 that the APD can utilize when switching application contexts. The APD therefore utilizes compute process control blocks 710 as a representation of the individual applications 702 which it services.

In accordance with an embodiment of the present invention, ring buffer 704 is guaranteed to be resident in memory when accessed by the APD and cannot be paged out. Kernel mode driver compute interfaces are used to allocate user space resident command buffers, which are accessible directly by APD hardware, allowing the compute work load dispatch and completion process to bypass any kernel mode transitions. With the support of the IOMMUv2 and APD hardware, page faulting is supported for the user space command (and data) buffers 706, which allows these buffers to avoid the overhead of memory pinning, in accordance with an additional embodiment of the present invention.

In contrast to the data flow models of FIGS. 3 and 4, where kernel mode software must traverse commands submitted by a user mode application to patch virtual memory references, thereby ensuring all references are to resident pinned system or APD memory, the APD is able to access ring buffer 704 directly prior to any patching taking place. Therefore, the APD must be able to identify and handle page faults by one of various mechanisms.

For example, when an instruction referencing virtual memory is handled by the APD, a determination is made as to whether the virtual memory address corresponds to a physical memory address (e.g., using a page table). If not, the APD can trigger a page fault to the system's CPU, allowing the CPU to retrieve data from the corresponding virtual memory address into pinned system or APD memory. If the APD's capabilities permit, the APD can switch to another application context while blocking on the page fault, or can instead stall while waiting for the page fault to be serviced.

In accordance with a further embodiment of the present invention, the APD can probe an instruction prior to servicing to determine whether a page fault is necessary, and if so, will trigger the page fault mechanism interrupt of the CPU.

From the perspective of a user mode application 702, the aforementioned functionality allows direct interaction with the APD in a similar manner to the system's CPU. This characteristic of certain embodiments of the present invention is said to establish the APD as a "first-class citizen", relative to the CPU.

Figure 8:
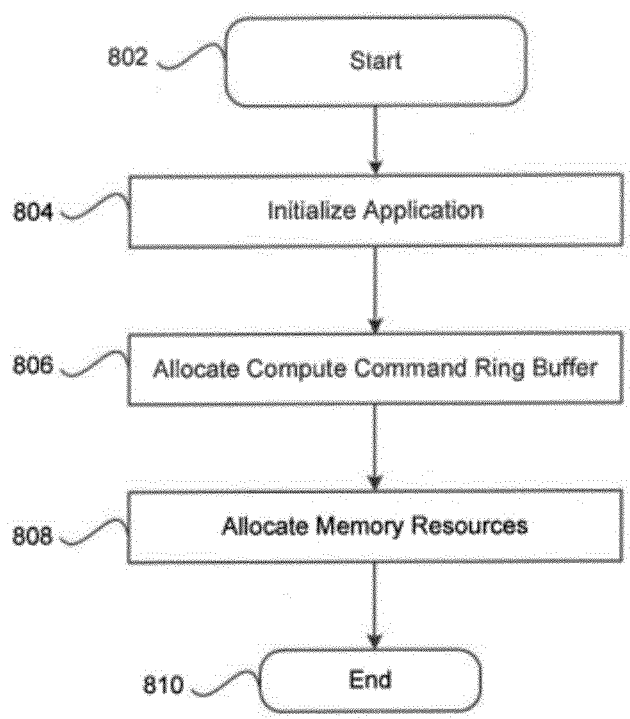
FIG. 8 is a flowchart illustrating steps by which an application is initialized, in accordance with an embodiment of the present invention.

FIG. 8 is a flowchart illustrating steps by which an application, such as application 702 of FIG. 7, is initialized, in accordance with an embodiment of the present invention. The method begins at step 802 and proceeds to step 804 where the application itself is initialized. One skilled in the relevant arts will appreciate that the initialization process of step 804 may include a number of different functions that are application-specific.

By way of non-limiting example, initialization of the application at step 804 includes the creation of a compute process control block, such as compute process control block 710 of FIG. 7. One skilled in the relevant arts will appreciate that other mechanisms may be used by which a representation of the application, accessible to the APD, can be maintained and updated.

Steps 806 and 808 illustrate initialization processes to applications exploiting aspects of the present invention. At step 806, a ring buffer (such as ring buffer 704 of FIG. 7, or other form of command buffer (e.g., FIFO queue)) is allocated to the application, and memory resources are allocated at step 808. The method then ends at step 810.

As previously noted, allocation of the ring buffer 704 and memory resources at steps 806 and 808, respectively, is handled through interaction with a kernel mode driver or other kernel mode software (e.g., an application allocates ring buffer 704 and registers it with the kernel mode software as in step 604 of FIG. 6). The ring buffer 704 and memory resources are accessible to the application and the APD, without the need to block other applications or transition to kernel mode to utilize the resources.

Figure 9:
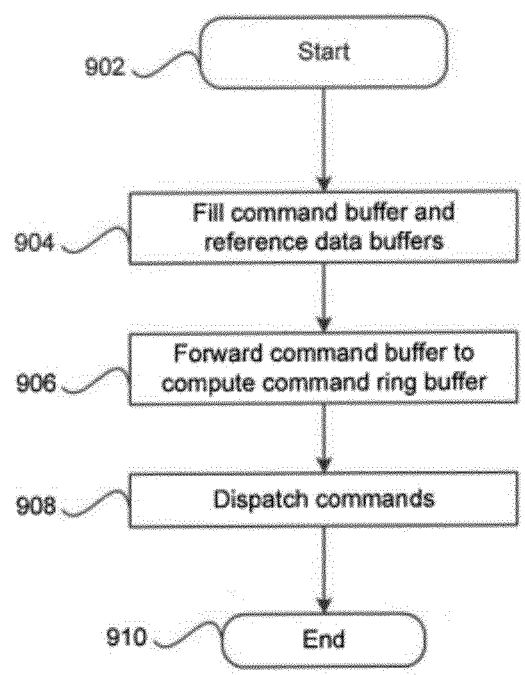
FIG. 9 is a flowchart illustrating steps by which the application provides commands for execution by the APD.

FIG. 9 is a flowchart 900 illustrating steps by which the application provides commands for execution by the APD. The method begins at step 902 and proceeds to step 904 where the application fills a command buffer and any reference data buffers. The commands stored in the command buffer, such as command buffer 706 of FIG. 7, are forwarded to a ring buffer, such as ring buffer 704 of FIG. 7. Ire accordance with a further embodiment of the present invention, commands may instead be placed by an application directly in the ring buffer 704 as in step 906, skipping the use of a separate command buffer.

At step 908, the commands in ring buffer 704 are ready for dispatch. The method ends at step 910. As previously noted, the APD hardware has direct access to the commands stored in ring buffer 704, and can begin processing commands from an appropriate application's ring buffer 704 as required, such as when instructed to do so by a scheduling algorithm.

By allocating a ring buffer to each application, such as by step 604 of FIG. 6, it is possible to handle scheduling in a variety of different ways. In particular, scheduling in the data flow models illustrated in FIGS. 3 and 4 is accomplished by pushing data into a unified ring buffer for an APD, from which the API) hardware would pull operations in whatever order they were presented. In order to signal completion of a particular packet of data placed in the ring, a technique is used whereby the last operation in an operation packet in the unified ring buffer increments a timestamp. However, this operation adds latency and requires inefficiencies introduced by execution of a hardware interrupt. This approach also lacks resolution when determining precisely how many operations have been processed in a particular timeframe, as completion is determined for the packet of operations as a whole.

In contrast, exemplary embodiments of the present invention allow a scheduler or other mechanism to select a particular application context to execute next (such as an application identified by a compute process control block 710 of FIG. 7), providing instructions from the selected application's 702 ring buffer 704 to the APD for execution. Additionally, a work packet in the application's ring buffer 704 can itself signal completion entirely within user mode, providing a lower cost and resolution configurable solution to completion signaling.

Figure 10:
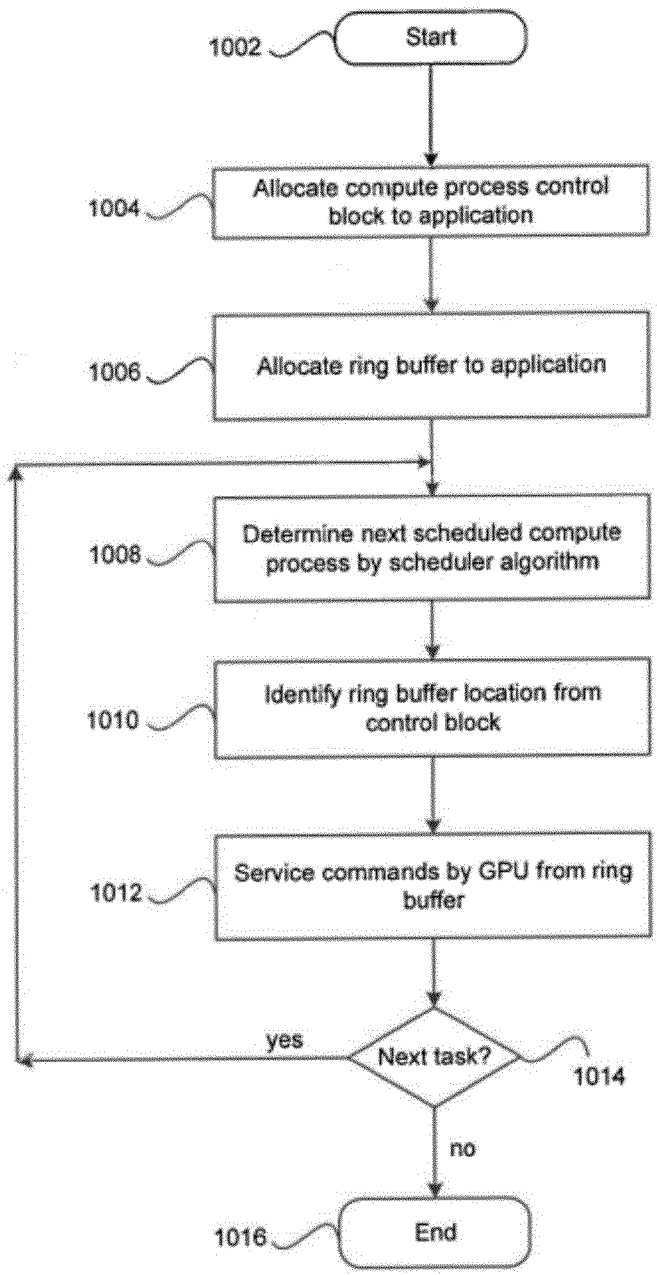
FIG. 10 is a flowchart illustrating steps by which a scheduler schedules processing of APD commands, in accordance with an embodiment of the present invention.

One skilled in the relevant arts will appreciate that a number of approaches to scheduling can be applied to the embodiments disclosed herein, and the approaches described herein are provided by way of example, and not limitation. FIG. 10 is a flowchart 1000 illustrating steps by which a scheduler, such as APD scheduler 508*a* of FIG. 5, schedules processing of APD commands, in accordance with an embodiment of the present invention. The method begins at step 1002 and proceeds to step 1004 where a compute process control block 710 is allocated to an application 702 (such as during application initialization). At step 1006, a ring buffer 704 or other data structure for queuing commands from application 702 is allocated to the application 702.

At step 1008, the scheduler determines the next application to be scheduled. This can be accomplished, by way of non-limiting example, through selection of a compute process control block or runlist 710 corresponding to a next application to be scheduled. Selection of the next compute process control block 710 may be handled by a number of scheduling algorithms, such as round-robin scheduling. Use of other scheduling algorithms will be apparent to those skilled in the relevant arts.

In accordance with an additional embodiment of the present invention, an application 702 is able to notify the APD that it is eligible to be selected for execution. This is handled, by way of non-limiting example, through the use of a "doorbell" signal by the application whenever commands are added to the ring buffer 704. If the APD has not been informed of waiting commands through the use of the "doorbell" signal, it can skip to the next compute process control block 710 at step 1008 which has signaled that commands are present in its ring buffer 704, or that the APD otherwise knows to have ready APD commands.

Once the scheduler has identified the next application 702 to be executed by its corresponding compute process control block 710, the APD obtains the location of the application's ring buffer 704 from the compute process control block 710. The APD can then service commands at step 1012 directly from the ring buffer 704.

Application 702 is able to place only APD-bound commands in ring buffer 704, while remaining free to separately execute CPU-bound commands. This means that the CPU and APD can operate on instructions at different speeds and frequencies, without having to wait for completion by the other (except in the event of dependencies). While the APD is servicing commands at step 1012, the CPU can continue operation on its own commands.

The APD continues to service a number of commands at step 1012, and then proceeds to step 1014 where the scheduler may schedule a different application for APD time, in which case the method proceeds again to step 1008. If no further applications remain to be scheduled, the method ends at step 1016 and the APD remains idle.

The number of commands serviced by the APD at step 1012 prior to scheduling of a subsequent application may be controlled by a number of factors. One skilled in the relevant arts will appreciate that these factors are exemplary, and other techniques may be employed instead to control the amount of APD time allocated to an application. For example, if the application 702 terminates, or if the ring buffer 704 is emptied by the APD (i.e., no further APD-bound commands queued for execution), then the scheduler can immediately schedule the next application for execution.

Additionally, the scheduler can switch context to another application (steps 1014 followed by 1008) prior to servicing all commands in the ring buffer 704 to allow APD multitasking. This can be handled through the use of a timer, which triggers the context switch when it expires (e.g., after a number of clock cycles, or after a certain amount of "wall-time" has elapsed). This timer may optionally be set through a value assigned to an application 702 and stored in its compute process control block 710. Additionally, a priority value in compute process control block 710 may assist the scheduler in determining how many commands to service from the ring buffer 704 at step 1012 prior to a context switch.

Figure 11:
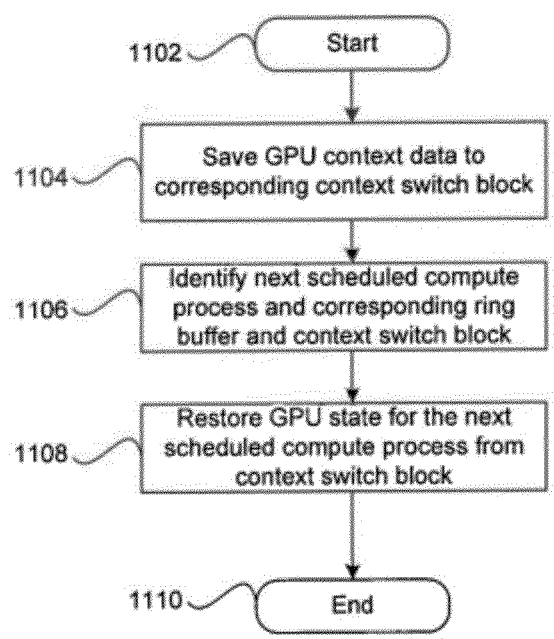
FIG. 11 is a flowchart illustrating steps by which the state of execution is preserved in a context switch, in accordance with an embodiment of the present invention.

When a context switch occurs, the state of execution of the current application's APD-bound commands from ring buffer 704 should be saved. This allows the APD to continue processing the commands from ring buffer 704 using the same execution state, including any register values the commands may rely on. FIG. 11 is a flowchart 1100 illustrating steps by which the state of execution is preserved in a context switch, in accordance with an embodiment of the present invention.

The method begins at step 1102 and proceeds to step 1104, where the APD state (e.g., register values, next instruction, etc.) of an application 702 to be context-switched-out in favor of another is stored in the application's 702 corresponding context switch block 712. At step 1106, the scheduler identifies the next application 702 to be scheduled (via its compute process control block 710), along with its corresponding ring buffer 704 and context switch block 712 referenced by the compute process control block 710. Then at step 1108, the APD restores its state using the state saved in context switch block 712 for the next application 702. The method then ends at 1110. This allows the application 702 that has been context-switched-in to continue APD execution where it left off.

While the foregoing application describes hardware-bound scheduling, it is also possible to combine hardware- and software-bound scheduling in accordance with a further embodiment of the present invention. This technique allows a software-based scheduler to predict (through the use of heuristics by way of non-limiting example) which application should be permitted APD time next, and register the application to be scheduled next by the APD.

Figure 12:
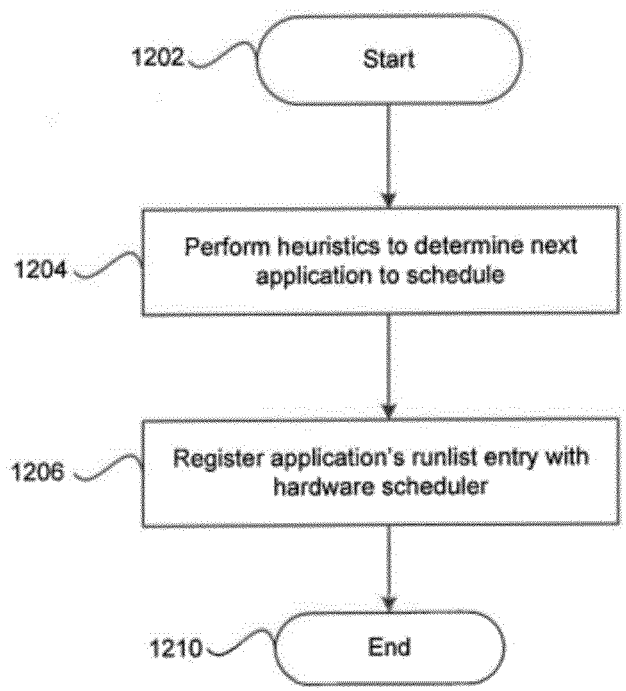
FIG. 12 is a flowchart illustrating steps by which a software-based scheduler can provide guidance to a hardware-based scheduler, in accordance with an embodiment of the present invention.

FIG. 12 is a flowchart 1200 illustrating steps by which a software-based scheduler can provide guidance to a hardware-based scheduler. The method begins at step 1202 and proceeds to step 1204 where the software-based scheduler performs some heuristic determination of the next application 702 that should be scheduled. Then at step 1206, the software-based scheduler registers the runlist entry 710 of application 702 with the hardware scheduler, permitting application 702 to thereby be scheduled to run. The method ends at step 1210. This is in contrast to automatically scheduling all application contexts to run, allowing fine-grain control by a software-based component instead.

In accordance with an additional embodiment of the present invention, when such changes are made to the set of runlist entries 710 known by the APD, the entire set of runlist entries 710 is resubmitted to allow the hardware scheduler to reevaluate the scheduling order. The changes that trigger this behavior include adding another runlist entry, deleting a runlist entry, or editing one or more of the runlist entries (e.g., in order to change the priority of an application context).

Various aspects of the present invention can be implemented by software, firmware, hardware, or a combination thereof. For example, the methods illustrated by flowcharts 300 of FIG. 3, 800 of FIG. 8, 900 of FIG. 9, 1000 of FIG. 10, 1100 of FIGS. 11, and 1200 of FIG. 12 can be implemented in unified computing system 100 of FIG. 1. Various embodiments of the invention are described in terms of this example unified computing system 100. It would be apparent to a person skilled in the relevant art how to implement the invention using other computer systems and/or computer architectures.

In this document, the terms "computer program medium" and "computer-usable medium" are used to generally refer to media such as a removable storage unit or a hard disk drive. Computer program medium and computer-usable medium can also refer to memories, such as system memory 106 and graphics memory 130, which can be semiconductor memories (e.g., DRAMs, etc.). These computer program products are means for providing software to unified computing system 100.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

CONCLUSION

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   selecting a user mode application for scheduling by a scheduler; and
   dispatching commands, in a user mode, directly to an accelerated processing device from a work queue allocated to the user mode application by a kernel mode driver, the work queue being accessible to the user mode application and the accelerated processing device without transitioning to a kernel mode.

2. The method of claim 1, further comprising:
   storing the commands in a command buffer and forwarding the commands from the command buffer to the work queue.

3. The method of claim 1, further comprising:
   allocating accelerated processing device-accessible memory resources to the user mode application.

4. The method of claim 1, wherein allocating the work queue for the user mode application comprises allocating a compute command ring buffer.

5. The method of claim 1, further comprising: allocating a compute process control block corresponding to the user mode application, the compute process control block storing information identifying a location of the work queue for the user mode application.

6. The method of claim 5, wherein dispatching the commands from the work queue to the accelerated processing device comprises accessing the work queue by the accelerated processing device, based on the location information from the compute process control block, to read commands.

7. The method of claim 5, further comprising: allocating a compute process list comprising references to the compute process control block and one or more additional compute process control blocks.

8. A non-transitory computer-usable medium having instructions recorded thereon that, if executed by a computing device, cause the computing device to perform a method comprising:
   selecting a user mode application for scheduling by a scheduler; and
   dispatching commands, in a user mode, directly to an accelerated processing device from a work queue allocated to the user mode application by a kernel mode driver, the work queue being accessible to the user mode application and the accelerated processing device without transitioning to a kernel mode.

9. The non-transitory computer-usable medium of claim 8, further comprising: storing the commands in a command buffer and forwarding the commands from the command buffer to the work queue.

10. The non-transitory computer-usable medium of claim 8, further comprising: allocating accelerated processing device-accessible memory resources to the user mode application.

11. The non-transitory computer-usable medium of claim 8, wherein allocating the work queue for the user mode application comprises allocating a compute command ring buffer for the user mode application.

12. The non-transitory computer-usable medium of claim 8, further comprising:
    allocating a compute process control block corresponding to the user mode application, the compute process control block storing information identifying a location of the work queue for the user mode application.

13. The non-transitory computer-usable medium of claim 12, wherein dispatching the commands from the work queue to the accelerated processing device comprises accessing the work queue by the accelerated processing device, based on the location information from the compute process control block, to read commands.

14. The non-transitory computer-usable medium of claim 12, further comprising:
    allocating a compute process list comprising references to the compute process control block and one or more additional compute process control blocks.

15. A system comprising:
    a memory; and
    a processor configured to:
       select a user mode application for scheduling by a scheduler, and
       dispatch commands, in a user mode, directly to an accelerated processing device from a work queue allocated to the user mode application by a kernel mode driver, the work queue being accessible to the user mode application and the accelerated processing device without transitioning to a kernel mode.

16. The system of claim 15, wherein the processor is further configured to store the commands in a command buffer and forward the commands from the command buffer to the work queue.

17. The system of claim 15, wherein the processor is further configured to allocate accelerated processing device-accessible memory resources to the user mode application.

18. The system of claim 15, wherein allocating the work queue for the user mode application comprises allocating a compute command ring buffer for the user mode application.

19. The system of claim 15, wherein the processor is further configured to allocate a compute process control block corresponding to the user mode application, the compute process control block storing information identifying a location of the work queue for the user mode application.

20. The system of claim 19, wherein dispatching the commands from the work queue to the accelerated processing device comprises accessing the work queue by the accelerated processing device, based on the location information from the compute process control block, to read commands.

21. The system of claim 19, wherein the processor is further configured to allocate a compute process list comprising references to the compute process control block and one or more additional compute process control blocks.

* * * * *